United States Patent [19]

Levine et al.

[11] Patent Number: 4,661,314

[45] Date of Patent: Apr. 28, 1987

[54] METHOD OF MAKING TEXTURIZED HEAT SHRINKABLE TUBING

[75] Inventors: Herbert R. Levine, Dover; Stephen G. Gerrato, Greenland; Benoit L. Poulin, Hudson, all of N.H.

[73] Assignee: Essex Group, Inc., Fort Wayne, Ind.

[21] Appl. No.: 818,857

[22] Filed: Jan. 15, 1986

Related U.S. Application Data

[62] Division of Ser. No. 465,719, Feb. 11, 1983, Pat. No. 4,576,207.

[51] Int. Cl.⁴ .............................................. B29C 61/08
[52] U.S. Cl. ..................................... 264/508; 156/86;
    264/230; 264/249; 264/342 R; 264/DIG. 71
[58] Field of Search ................... 264/230, 249, 342 R,
    264/DIG. 71, 231, 177 R, 209.8, 173, 505, 508,
    506; 156/86

[56] References Cited

U.S. PATENT DOCUMENTS

| 2,716,777 | 9/1955 | Hagen | 264/DIG. 71 |
| 3,086,242 | 4/1963 | Cook et al. | 264/230 |
| 3,872,194 | 3/1975 | Lowry et al. | 264/230 |
| 3,957,382 | 5/1976 | Grevel, Jr. et al. | 264/230 |
| 4,101,699 | 7/1978 | Stine et al. | 264/173 |
| 4,231,834 | 11/1980 | Gonzalez | 264/230 |
| 4,440,712 | 4/1984 | Imgram | 264/230 |
| 4,467,002 | 8/1984 | Crofts | 264/230 |

FOREIGN PATENT DOCUMENTS

| 1056970 | 2/1967 | United Kingdom | 264/230 |
| 1331195 | 9/1973 | United Kingdom | 264/230 |

*Primary Examiner*—Jeffery Thurlow
*Attorney, Agent, or Firm*—Harry J. Gwinnell

[57] ABSTRACT

A heat shrinkable tubing is described which has a texturized surface. Upon applying the heat shrinkable tubing to a complex shaped object and applying heat the tubing shrinks radially and linearly, uniformly so as to preserve the texturized friction surface, shrinking over depressions and expansions of the complex surface without wrinkling.

2 Claims, 3 Drawing Figures

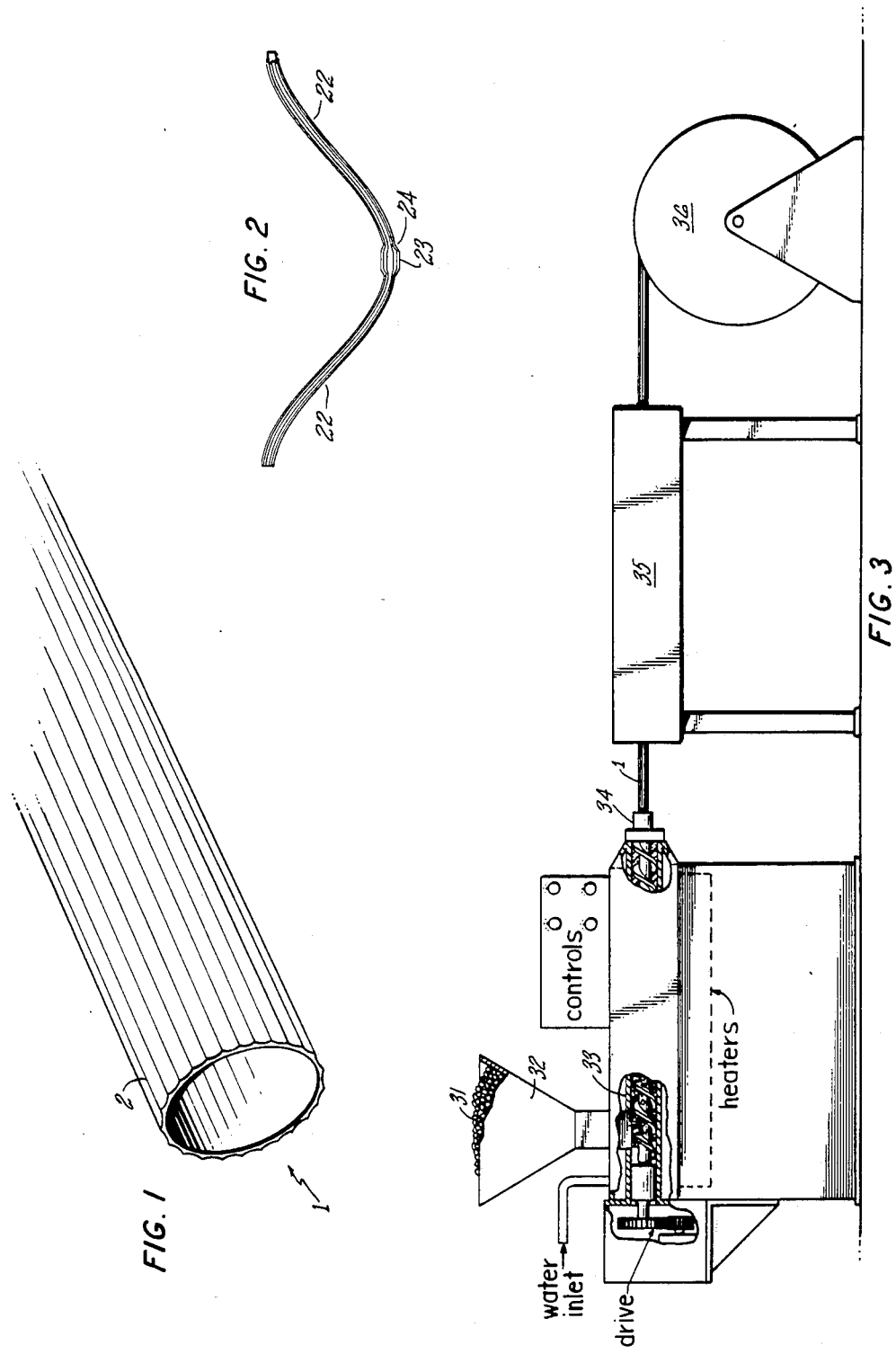

METHOD OF MAKING TEXTURIZED HEAT SHRINKABLE TUBING

This a division of co-pending application Ser. No. 465,719 filed on Feb. 11, 1983, now U.S. Pat. No. 4,576,207 issued Mar. 18, 1986.

TECHNICAL FIELD

The field of art to which this invention pertains is heat shrinkable polymer tubing and methods of making the same.

BACKGROUND ART

Heat shrinkable tubing has been in existence for many years. The use of heat shrinkable tubing, when properly formulated, provides a quick and economical method of covering various materials for a variety of purposes. For example, heat shrinkable tubing may be applied to a material for electrical insulation purposes, for protection against the elements, or to improve the feel of the material to the hand. Because of the wide variety of uses of such material there is an ongoing search for ways to improve the tubing itself, the manner in which it can be applied, improvement in its appearance, and its performance in the heat shrink operation. For example, it has been known that when applying heat shrinkable tubing to complex shaped articles containing many bends, expanded and depressed areas, that the tubing can have a tendency to wrinkle upon shrinkage, particularly at the inside radius of curved portions of the article to be covered. Accordingly, any improvements in heat shrinkable tubing have the potential of opening up entire new areas of use for such articles.

DISCLOSURE OF THE INVENTION

The present invention is directed to heat shrinkable tubing extruded with raised portions on its surface so as to provide improved properties and performance of such tubing in use. Such improved performance can take the shape of improved grippability, esthetic appearance, heat dissipation, electrical insulating properties etc. The tubing is also formed so as to have a substantially lengthwise shrinkage so when placed over a material to be covered it conforms to bends, depressed and expanded areas with no wrinkling. The raised portions on the tubing are also extruded onto the heat shrinkable tubing so as to provide maintenance of a textured pattern even after heat shrinking.

Another aspect of the invention includes a method of making such tubing by melting polymer in an extruder barrel, extruding the polymer through a forming die so as to produce a textured pattern, and cooling the extruded material, the extrusion and cooling performed under tension here (as well as elsewhere in the manufacturing process) so as to provide a negative elastic memory, thus insuring the above-described smooth conformity to complex shaped substrates.

The foregoing, and other features and advantages of the present invention, will become more apparent from the following description and accompanying drawings.

BRIEF DESCRIPTION OF DRAWINGS

FIG. 1 shows a typical heat shrinkable tubing according to the present invention.

FIG. 2 shows a typical heat shrinkable tubing according to the present invention after heat treatment on a complex shaped article.

FIG. 3 shows typical apparatus useful for forming tubing according to the present invention.

BEST MODE FOR CARRYING OUT THE INVENTION

Polyvinyl chloride is a typical polymeric material useful for making the tubing according to the present invention. However, because of its cost and polymeric properties such as abrasion resistance, other material such as silicone, polyolefin, neoprene, ethylene-propylene-diene terpolymer, resins, etc. can also be utilized (either alone or in admixture) based on the correlation of polymer properties and intended use. These materials are purchased commercially in either pellet or granular form and fed as such into extrusion apparatus.

The polymeric material is extruded in continuous lengths and typically wrapped upon a take-up reel after formulation. The inner diameters and thicknesses of the tubing vary depending on the intended use of the product but will typically range from about 40 mils to about 5 inches in expanded inside diameter with recovered wall thicknesses ranging from 5.0 mils to 0.3 inch.

While the preferred texturized patterns on the heat shrinkable tubing are raised, substantially parallel lines (a "corduroy" pattern) any pattern which provides raised or uneven portions on the surface of the otherwise smooth tubing are acceptable. For example, intermittent rather than continuous lines may be used.

As formed, the heat-shrink material according to the present invention typically contains about 5% to about 30% longitudinal shrinkage memory. Such memory is built into the tubing by processing under tension as described below. This allows the tubing to be heat-shrunk over a variety of complex shapes without creasing, crimping or wrinkling upon shrinkage onto the intended substrate. Furthermore, the texturized surface shrinks uniformly not only providing a comfortable friction-grippable surface but a pleasant decorative finish as well. Because its surface has been increased by the texture, the ability of this tubing to dissipate heat during use is substantially increased.

In FIG. 1 the heat shrinkable tubing 1 is shown with raised ribs 2. A comparison with FIG. 2 showing the same tubing with the same ribs after heat shrinkage over a metal bar, demonstrating the uniformity of the tubing of the present invention.

Referring to FIG. 3 a better understanding of the method is demonstrated. Polymeric pellets or granules 31 are added to the extruder hopper 32. The polymeric material is reduced to a plastic state in the heated barrel 33 of the extruder and is forced by a rotating screw in the barrel 33 through extrusion head 34. The extruded tubing immediately is drawn through cooling bath 35 while it is held in tension. Following exit from the cooling bath the tubing is wrapped up on take-up reel 36. Following extrusion and takeup, the tubing is unwound and reheated, for example, by passing it through heating fluid (such as Carbowax). A positive pressure (e.g. air) is imparted to the inside of the heated tubing to cause the desired degree of radial expansion. At the same time, the desired degree of linear shrinkage characteristics are imparted to the reheated tubing by holding it in tension, for example between a pinch roller and capstan device.

Shrinkage of the extruded tubing is effected by any heat source conventionally used in this art such as a hot air blower, infrared heater, oven, heat tunnel, etc. Since a 5% to 30% longitudinal shrinkage memory is built into the tubing, a corresponding linear excess of material should be used to ensure proper coverage of any article being covered.

As stated, FIG. 2 shows a typical application for the heat shrinkable tubing according to the present invention for a complex shaped handle grip with extensive bends 22, bulges 23, and depressions 24 covered with the heat shrinkable tubing according to the present invention and heated with a forced hot air dryer. As can be seen from the figure a smooth wrapped handle grip results with evenness of the textured pattern providing a uniform, decorative and comfortable grip. As can be appreciated such product is particularly useful for: tennis racquet handles, bats, hammers, ax handles, shovels, roller covers for powered conveyors, corrosion protection with increased heat transfer efficiency for heat transfer tubes, combined heat dissipation and electrical protection for sensitive electrical and electronic parts, anti-rattle coverings for automotive harnesses, comfort grip handle covers for lawnmowers, snowblowers, bicycle handle bars, etc. It should be noted that by virtue of its greatly increased surface area as compared to conventional smooth heat shrinkable tubings, heat transfer by this improved product is greatly enhanced.

While this invention has been described for a tubing which incorporates an appreciable degree of longitudinal shrinkage which provides for smooth crimp-fee application to curved and bent substrates, a textured product to be applied to straight substrates, where lengthwise shrinkage is not needed can also be made without significant lengthwise shrinkage.

Although this invention has been shown and described with respect to detailed embodiments thereof, it will be understood by those skilled in the art that various changes in form and detail thereof may be made without departing from the spirit and scope of the claimed invention.

We claim:

1. A method of making heat shrinkable tubing comprising melting polymeric material, extruding such material through a die to produce a pattern of substanially parallel raised portions extending externally across its entire length, while in a heated state imposing positive pressure to the interior of the tubing to impart radial shrinkage memory to the tubing and holding such tubing under linear tension to provide about 5% to about 30% longitudinal shrinkage memory to the tubing, cooling the tubing and rolling the tubing on a take-up reel resulting in tubing capable of shrinking in response to heat over bent, expanded and depressed substrate material in uniform, unwrinkled fashion.

2. A method of forming a texurized surface on a complex shaped object comprising placing a heat shrinkable tubing having a texturized surface of substanially parallel raised portions extending along its entire length, and about 5% to about 30% longitudinal shrinkage memory on the complex shaped object, applying heat to the tubing causing the tubing to shrink both radially and lineraly thus forming unwrinkled, decorative, uniform texturized surface on the complex shaped object.

* * * * *